(12) United States Patent
Li et al.

(10) Patent No.: US 10,080,100 B2
(45) Date of Patent: Sep. 18, 2018

(54) DYNAMIC USER-DEFINED CHECK-IN POINTS

(71) Applicant: University of Florida Research Foundation, Incorporated, Gainesville, FL (US)

(72) Inventors: Xiaolin Li, Gainesville, FL (US); Kaikai Liu, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/311,058

(22) PCT Filed: Sep. 2, 2015

(86) PCT No.: PCT/US2015/048133
§ 371 (c)(1),
(2) Date: Nov. 14, 2016

(87) PCT Pub. No.: WO2016/036853
PCT Pub. Date: Mar. 10, 2016

(65) Prior Publication Data
US 2017/0201858 A1 Jul. 13, 2017

Related U.S. Application Data

(60) Provisional application No. 62/047,001, filed on Sep. 7, 2014, provisional application No. 62/066,436, filed on Oct. 21, 2014.

(51) Int. Cl.
*H04W 24/00* (2009.01)
*H04W 4/021* (2018.01)
*H04W 4/02* (2018.01)

(52) U.S. Cl.
CPC ............ *H04W 4/021* (2013.01); *H04W 4/023* (2013.01)

(58) Field of Classification Search
CPC .............................. H04W 4/021; H04W 4/023
(Continued)

(56) References Cited

U.S. PATENT DOCUMENTS 8,284,748 B2 * 10/2012 Borghei ................ H04W 4/021
370/252
9,031,583 B2 * 5/2015 Pereira .................... H04W 4/02
455/456.1

(Continued)

OTHER PUBLICATIONS

Vasudevan, S. et al., "Design and analysis of a leader election algorithm for mobile ad hoc networks." *Proceedings of the 12th IEEE International Conference on Network Protocols*, Oct. 2004, pp. 350-360.

*Primary Examiner* — Marceau Milord
(74) *Attorney, Agent, or Firm* — Alston & Bird LLP (57) ABSTRACT

Techniques and systems are disclosed for enhancing the flexibility and resiliency of mobile social networking platforms. Techniques enable dynamic, user-defined check-in points with mobile devices so that users may define ad hoc, location-based communities. Techniques may also selectively determine an appropriate location-sensing mechanism to improve location accuracy or privacy, or to compensate for unavailable location-sensing capabilities. The techniques may assist social networking platforms to have a greater range of check-in options and to enable communication that may not rely on traditional network connectivity. In some cases, devices belonging to participators outside the member group may be used to locate a member who has moved outside the detection zone of a check-in point. In some cases, the participators' devices might not be directly connected to the lost member device but instead are connected via one or (Continued)

more "hops" of indirect communication with other participator devices.

22 Claims, 4 Drawing Sheets

(58) Field of Classification Search
USPC .................................. 455/456.1, 456.3, 457
See application file for complete search history.

(56) References Cited

U.S. PATENT DOCUMENTS

| | | | | |
|---|---|---|---|---|
| 9,369,847 B2* | 6/2016 | Borghei | ................ | H04W 4/021 |
| 9,503,851 B2* | 11/2016 | Ben-Dayan | ........ | G08B 21/0261 |
| 9,712,978 B2* | 7/2017 | Stewart | ................... | H04W 4/04 |
| 9,721,086 B2* | 8/2017 | Shear | ................... | H04L 63/20 |
| 9,841,494 B2* | 12/2017 | Meadow | ................... | G01S 5/10 |
| 2007/0030824 A1* | 2/2007 | Ribaudo | ............. | G01S 5/0018 |
| | | | | 370/328 |
| 2007/0282678 A1* | 12/2007 | Dendi | ................... | G06Q 30/02 |
| | | | | 705/14.11 |
| 2008/0201076 A1* | 8/2008 | Huang | ................... | G01C 21/00 |
| | | | | 701/469 |
| 2009/0005018 A1* | 1/2009 | Forstall | ............. | H04M 3/42348 |
| | | | | 455/414.1 |
| 2009/0325603 A1* | 12/2009 | Van Os | ................... | H04W 4/02 |
| | | | | 455/456.2 |
| 2010/0156599 A1 | 6/2010 | Ainsbury et al. | | |
| 2010/0325194 A1* | 12/2010 | Williamson | ............ | H04W 4/02 |
| | | | | 709/203 |
| 2011/0045847 A1* | 2/2011 | Roin | ....................... | H04W 4/02 |
| | | | | 455/456.3 |
| 2012/0008526 A1* | 1/2012 | Borghei | ................ | H04W 4/021 |
| | | | | 370/254 |
| 2012/0050033 A1* | 3/2012 | Westen | ................ | G01S 5/0027 |
| | | | | 340/539.13 |
| 2012/0190386 A1* | 7/2012 | Anderson | ............. | G01C 15/04 |
| | | | | 455/456.3 |
| 2013/0005362 A1* | 1/2013 | Borghei | ................ | H04W 4/021 |
| | | | | 455/456.3 |
| 2013/0110565 A1* | 5/2013 | Means, Jr. | ............ | G06Q 10/06 |
| | | | | 705/7.11 |
| 2013/0324166 A1 | 12/2013 | Mian et al. | | |
| 2014/0206389 A1* | 7/2014 | Aldana | ................ | H04W 4/021 |
| | | | | 455/456.2 |
| 2015/0111607 A1* | 4/2015 | Baldwin | ................. | H04W 4/02 |
| | | | | 455/500 |
| 2015/0242895 A1* | 8/2015 | Brown | .............. | G06Q 30/0257 |
| | | | | 705/14.55 |
| 2016/0021511 A1* | 1/2016 | Jin | ......................... | H04W 4/04 |
| | | | | 455/457 |
| 2017/0201858 A1* | 7/2017 | Li | ......................... | H04W 4/021 |

* cited by examiner

```
input  : The nearby set of participators $\mathbb{R}^d$, and the
         subset of participators with GPS location $\hat{x}_m$
         as $\mathbb{R}^d_a$
output: Estimated target location y
while The searching request is still effective do
    for every participator m that received the broadcast
    do
        /* Step 1: Get location and ranging.
         */
        calculate the ranging results $\hat{r}_m$ from BLE
        RSS measurement ;
        obtain the location $\hat{x}_m$ for participators with
        GPS location as set $\mathbb{R}^d_a$ (total number is $M_a$) ;
        if $M_a < 3$ then
            /* Step 2: Leveraging multi-hop.
             */
            for every participators in $\mathbb{R}^d$ do
                search $a_{m'}$, and obtain its nearby
                participators with GPS location ;
            end
            select $a_{m'}$ with largest $N_a$ ;
            obtain ranging measurements $\hat{r}_m$, $\hat{r}_{m'}$
            and $\hat{r}_{m',n}$ for all the participators in $\mathbb{R}^d$
            and $\mathbb{R}^d_{a,m'}$ ;
            perform SDP optimization via (6); obtain
            y and $x_{m'}$ ;
            /* Step 3: Virtual Anchor.          */
            if $N_a > 3$ then
                using $x_{m'}$ as a virtual anchor,
                construct new vector of anchors as
                $z_{m_a}$ ;
                estimate the new ranging vector as
                $r_{m_a} = [\hat{r}_m \quad \|\hat{y} - \hat{x}_{m'}\|_2]$ ;
                perform SDP optimization via the
                constraint of (7), and obtain $y_{op}$ ;
                leveraging historical information to
                estimate the variance of $y_{op}$ and $x_{m'}$
                as $\sigma^y$ and $\sigma_{m'}$ ;
                if $\sigma^y + \sigma_{m'} < \sigma_{th}$ & $\|y_{op} - y\|_2 < \gamma$
                then
                    | replace y with $y_{op}$ ;
                end
            end
        else
            | perform SDP optimization via (6) with
            | constraints from $\hat{r}_m$ only; obtain y ;
        end
    end
end
```

DYNAMIC USER-DEFINED CHECK-IN POINTS

CROSS REFERENCE TO RELATED APPLICATION(S)

This application claims the benefit of U.S. Provisional Application Ser. No. 62/047,001, filed Sep. 7, 2014, and U.S. Provisional Application Ser. No. 62/066,436, filed Oct. 21, 2014, both of which are hereby incorporated by reference in their entirety, including any figures, tables, or drawings.

GOVERNMENT SUPPORT

This invention was made with government support under grant number HP-1506361, awarded by the National Science Foundation. The government has certain rights in the invention.

BACKGROUND

A "social networking platform" is a collection of technologies supporting the connection and interaction of users with one another. A social networking platform may include a representation or profile of a user, the user's social links, and a variety of additional services. Social networking platforms are sometimes web-based services that allow individuals to create a public profile, to form groups with other users in order to share connections and interests, and to view and exchange communications and information with the other members. Social networking platforms may also include mobile device "apps" (i.e., software that runs on a mobile device) for interacting with social networking services. Examples of social networking platforms include Facebook®, Google+®, and LinkedIn®.

BRIEF SUMMARY

Techniques and systems are disclosed for enhancing the flexibility and resiliency of mobile social networking platforms. Techniques and systems enable dynamic, user-defined check-in points with mobile devices so that users may define ad hoc, location-based communities. Certain techniques also include selective determination of an appropriate location-sensing mechanism for communication between a device and a user-defined check-in point to improve location accuracy or privacy, or to compensate for unavailable location-sensing capabilities. The techniques may assist social networking platforms to have a greater range of check-in options and to enable communication that may not rely on traditional network connectivity.

A method of enabling user-defined check-in points can include: receiving, at a first group member device, a designation of the first group member device as a check-in point for a group having a plurality of members. A location-sensing capability is selected at the first group member device, and the first group member device detects, using the location-sensing capability, any group member devices having an identifier corresponding to a member of the group within a detection zone of the check-in point.

In operation, a check-in point broadcast can be turned on at a first group member device. Group members present within a detection zone of the first group member device can be identified by receiving indications from any devices that are within the detection zone of the first group member device and that have an identifier corresponding to a member of a group having a plurality of members including a first group member associated with the first group member device.

Broad applications realized using the described systems and techniques include, but are not limited to, checking student class attendance, monitoring employees' daily arrival and departure, and minimizing the likelihood that a member (e.g., friend, child, pet, etc.) will get lost or out of range when attending social events and other entertainment, party, and tourism activities.

In some cases, a lost member device does not have absolute location capabilities such as GPS. In some embodiments for finding lost members, devices belonging to participators outside the member group may be used to locate the member who has moved outside the detection zone of the check-in point. In some cases, the participators' devices might not be directly connected to the lost member device but instead are connected via one or more "hops" of indirect communication with other participator devices. In certain cases, some of the participator devices do not have or do not enable absolute location capabilities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2C shows an example process flow for implementing an embodiment using an SDP optimization and a virtual anchor.

DETAILED DESCRIPTION

Techniques and systems are disclosed for enhancing the flexibility and resiliency of mobile social networking platforms. Techniques and systems enable dynamic, user-defined check-in points with mobile devices so that users may define ad hoc, location-based communities. Certain techniques also include selective determination of an appropriate location-sensing mechanism for communication between a device and a user-defined check-in point to improve location accuracy or privacy, or to compensate for unavailable location-sensing capabilities. The techniques may assist social networking platforms to have a greater range of check-in options and to enable communication beyond that involving traditional network connectivity.

A "check-in point" is a location where a mobile device may be detected or registered as being present. Social networking platforms may use check-in points as a way for a user to keep other members of her social group informed of her location or presence at a venue. Members of the group may be notified when other members are within proximity. Some social networking platforms allow users to check-in at fixed locations, such as cafes, stadiums, shopping malls, or restaurants. These are fixed or absolute check-in points. In some cases, these social networking platforms may function through the use of mobile "apps" that enable users to manually check-in when they have arrived at a fixed location. Examples of social networking platforms having check-in points are Foursquare® and Gowalla®.

In some cases, users may automatically check-in when they set the mobile device or app to periodically broadcast their global positioning system (GPS) location to the service providing the app. The GPS location information may be communicated to the service using the network capability of the mobile device (e.g., over the Wi-Fi connection, when available, or over the device's mobile network internet capability).

However, a check-in process using GPS coordinates sent over a mobile device network may have at least two problematic aspects. First, the process may rely on the availability of a capable mobile device network (or Wi-Fi network) because some social networking platforms may require both GPS and network capability for autosensing features. However, a suitable mobile network that is capable of internet connectivity to a cloud service may not be available at all times indoors, in remote areas, or in "dead zones" (where no connection is possible, or is suppressed). Second, the automatic check-in process may rely on the constant updating of the device's GPS location to a third party; this means that a third party now has a complete record of a user's every movement. This aspect raises privacy concerns that may incline some users not to avail themselves of these otherwise useful apps and services.

In contrast to fixed check-in points, relative check-in points are not tied to a geographical location. Instead, the check-in point may move relative to the location of a member of a group whose membership may be dynamically defined.

In many social networking platforms, a user may define a social networking group comprised of other users (e.g., friends, relatives, colleagues). For example, a father may define a social group comprised of his children; or, a tour group leader may define a group comprised of the members of the tour group. A defining group member may be the member who defines or identifies the members of the social networking group (e.g., the father or tour group leader).

A dynamic, user-defined check-in point may be relative to a designated group member. In some cases, the designated group member's mobile device may serve as the check-in point whose physical location defines the relative location of the check-in point. Thus, as the designated group member's device moves, so does the physical location of the check-in point. However, the devices of other group members or even of stand-alone devices may also be the check-in point for the relative location in some cases.

In some cases, techniques may use selective or "opportunistic" location-sensing to determine the location or presence of a user device. An appropriate form of location sensing may be determined according to several criteria, including: the availability of a mobile device network or location-sensing capability, the granularity (i.e., precision or definiteness) of location-sensing required for a particular scenario, and user privacy concerns with respect to location broadcasting. In some cases, techniques for opportunistic location sensing may be preferentially used to diminish privacy concerns by limiting third party access to location data.

Various mechanisms may be used in an implementation to enable opportunistic location-sensing. Some forms of location-sensing may be based on interaction with a provider network, and some forms may be based on communication between individual devices. Provider-network forms of location-sensing include GPS satellites, Wi-Fi received signal strength indication (RSSI), and Wi-Fi wireless fingerprinting. GPS tracks location by triangulating the device's position relative to the signal received by multiple GPS satellites. Wi-Fi RSSI takes the signals a mobile phone detects from nearby access points and refers to a database listing the location of each uniquely identified access point. RSSI then compares signal strengths with respect to those known access points to determine distance, with an accuracy down to tens of meters. Wi-Fi "wireless fingerprinting" uses profiles locations based on the pattern of Wi-Fi signals found there; gathered patterns may then be compared to known patterns to identify a location.

Device-to-device mechanisms may be used for location-sensing. For example, Bluetooth Low-Energy Scanning (BLE) may be used for location-sensing in some implementations. Another device-to-device mechanism that may be used to detect the location of devices is based on patterns of acoustical emanations from the microphone/speaker, mobile device notification vibrations (e.g., length and frequency), or user interactions (e.g., key-presses and other tapping on the device by the user). In some cases, these emanations may not be audible to the human ear. Other forms of location-sensing are, of course, possible.

A check-in point, either fixed/absolute or relative, can be dynamically created and updated according to users' mobility and intention. Group members not only include online "friends" with smartphones, but also entities with whom a person has a relationship (e.g., children, elders, pets) and that have a registered wearable tag or device with BLE or other proximity-aware wireless technologies (e.g., radio or audio). Group members can interact with each other in a transparent, reactive, and proactive manner beyond the conventional online social networks (where users perform common interactions such as manually typing, searching and posting). Immediate notification can be pushed automatically onto devices having an application supporting the described techniques when a member joins or becomes lost (i.e., separates a distance from the check-in point).

Figure 1:
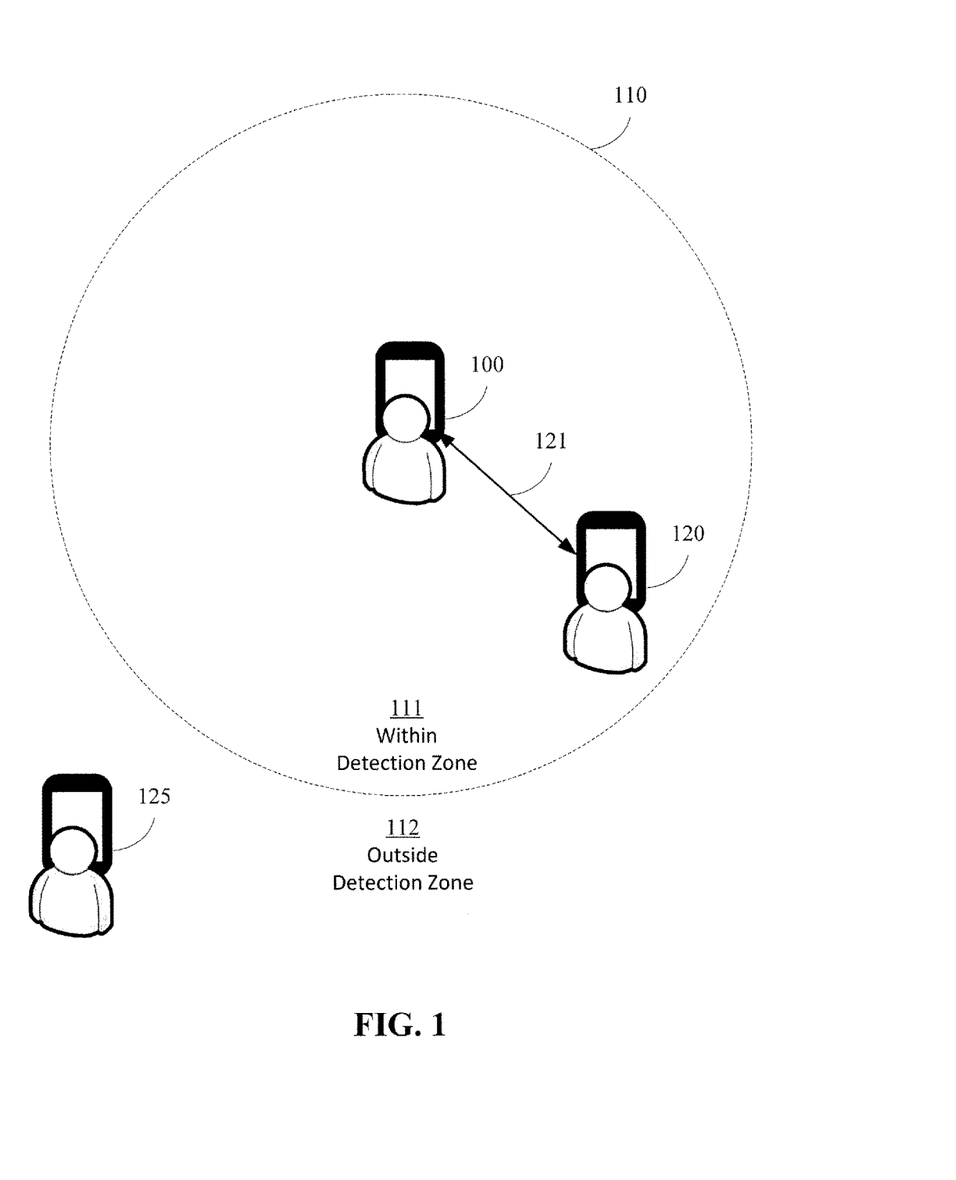
FIG. 1 shows a user-interaction diagram illustrating some aspects of a dynamic, user-defined check-in point.

FIG. 1 shows a user-interaction diagram illustrating some aspects of a dynamic, user-defined check-in point. In FIG. 1, a user having a mobile device 100 is shown. The presence of user device 100 at a location may create a relative check-in point having a "detection zone" 110 emanating out to a certain radius from the user device 100. In some cases, the distance the radius extends may be an arbitrary distance set by options or parameters within the social networking service. In some cases, the distance may be defined by the capabilities or range of the communication, geolocation, or sensing mechanisms utilized by the user device 100 to define the check-in point detection zone 110. It should be noted that, while depicted as two-dimensional here, the detection zone 110 may be three-dimensional. In addition, the detection zone 110 may not in all cases be symmetrical, as when structures, barriers, or other factors may block or enhance location-sensing signals to make the zone asymmetrical. It should also be noted that the check-in point may move with user device 100 so that the detection zone boundary 110 is not fixed in space, but moves relative to the location of user device 100.

The detection zone 110 defines whether a device is detectable 111 or undetectable 112. Devices are detectable 111 within the detection zone 110, and devices are undetectable 112 outside the detection zone 110. In FIG. 1, user device 120 is within the detection zone 110 so that exchange of an identifier 121 is possible between devices 100 and 120. Exchange of the identifier 121 enables the devices 100, 120 to determine mutual membership in a common social networking member group. In some cases, notification of the check-in of user device 120 may then be communicated to a social networking service or to other social networking group members who may or may not be present at the check-in point. A device 125 is shown outside the detection zone 110. Device 125 is undetectable 112; and thus no exchange of identifiers may occur.

Examples of cases in which dynamic, user-defined check-in points may be helpful are numerous. A mother, for example, may form a social networking group having her children as members. The mother's mobile device may become a check-in point for detecting the presence of her children's devices within a desirable distance. The mother may be notified by her device when the device detects that a child has moved outside the zone. The device interface may also express distance and directional information for each child. Since the check-in point is defined by and relative to the mother's location (based on the mother's device), the check-in point is continuous and need not be frequently re-designated. This can be helpful in crowded environments such as a playground or shopping center.

A similar scenario may be envisioned in the tracking of elders by a caregiver, or between friends at a concert, or between a tour group leader and her tour group visiting a busy tourist site. In another scenario, a professor or teacher of a class may form a social networking group containing the members of her class. Upon arrival at a classroom, she may designate her device as a check-in point and attendance may be recorded as students arrive due to their devices being detected within a detection zone 110 of the teacher's device. Processing on the data regarding attendance may be carried out at the teacher's device or at a central server after being uploaded from the teacher's device. This scenario is indicative of other related areas where attendance tracking of groups is desirable, for example the tracking of the employees at a workplace for time-card entries.

In some cases, when a group member goes out of the detection zone of the check-in point, e.g., one child is lost, a group leader may report a "lost member" request to a cloud service that may manage or facilitate certain member interactions. In some cases, for example, a wearable tag of the lost member may not contain GPS localization capability. To determine the location of the lost group member, the cloud service may leverage nearby participators' smartphones (or other computing devices) to perform crowd sensing in a transparent way (e.g., in the background). The participator may or may not be the group member, but enables the crowd sensing capability in her/his device.

For the crowd sensing process, the wearable tag of the lost member broadcast an SOS beacon when lost (e.g., outside of a detection zone of the group leader), nearby participators' smartphones may receive the SOS beacon and report all the available information to the cloud in background. The participators' location may or may not be available, but the reported information contains its nearby radio signal strength as fingerprint, and this participator will act as a second hop to propagate the beacon. Each participator repeats this process until the termination condition is reached, e.g., maximum hop count. The cloud service can aggregate the information reported from participators to estimate the true location of the lost member, and then report the estimated location back to the group leader or help requester. A comprehensive description of the techniques and implementations of the lost member embodiment is included herein.

Figure 2A:
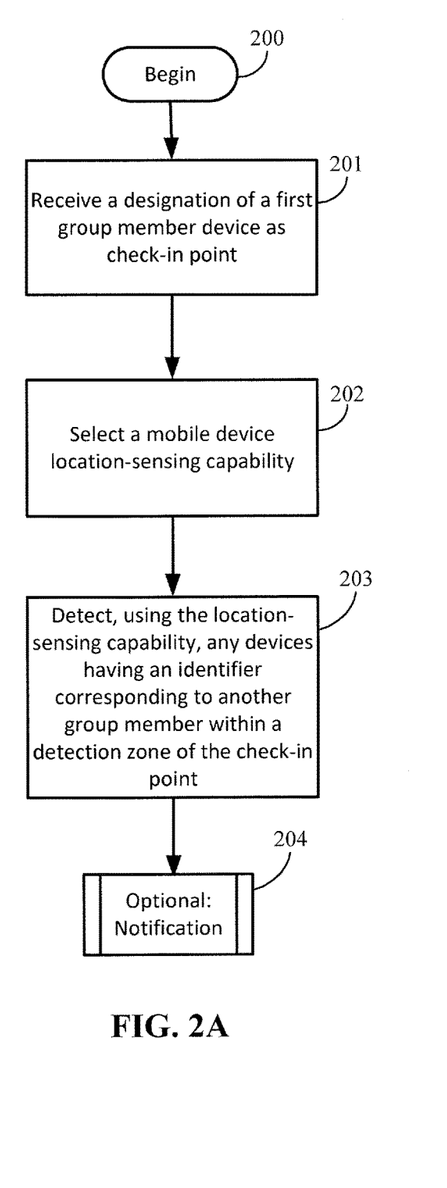
FIGS. 2A-2B show example process flows for implementing dynamic, user-defined check-in points on a social networking platform or component thereof.
Figure 2B:
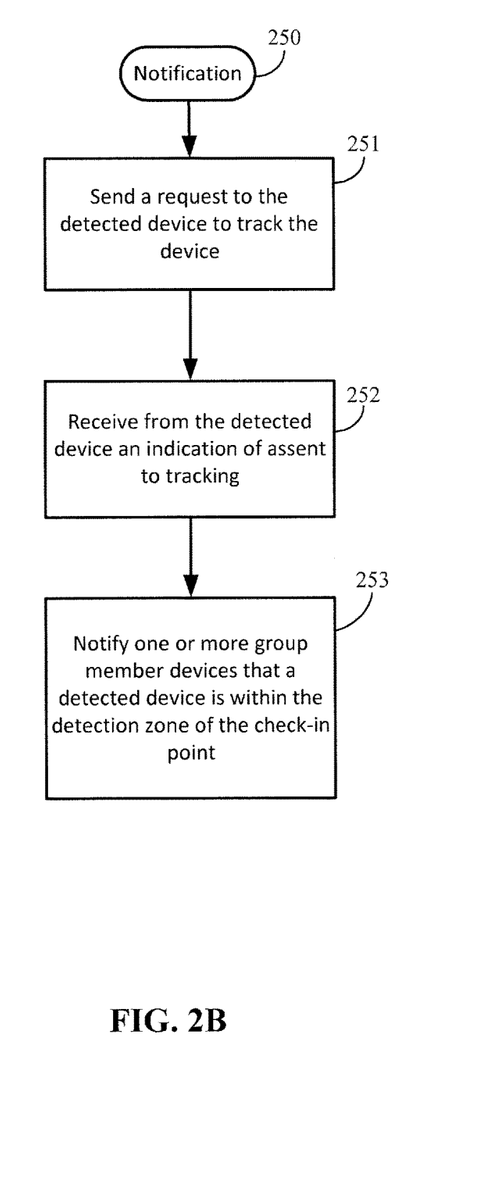

FIGS. 2A-2B show example process flows for implementing dynamic, user-defined check-in points on a social networking platform or component thereof. Generally, a user-defined check-in point is operative in a social networking platform or service supporting the creation of groups having two or more members. Mechanisms for defining and modifying social groups as between members of a social networking service are well-established.

The designation of a first group member device as a check-in point (200) may be initiated, in some cases, by a group member interacting with an interface on their device to trigger the device as a check-in point. The interface may be surfaced by a mobile device app, for example, or through a web interface available from the social networking service.

In some cases, designation of a first group member mobile device as a check-in point may have been initiated automatically as a result of the first group member device having been the defining member of the social networking group. Or, in some cases the social networking group may have been created with the property of enabling location-based check-ins whenever members come within proximity of one another. In these or other cases, the mobile device may be set to a mode of operation where the automatic sensing of encounters with other group members may be detected.

In whichever way the designation of the first group member device as a check-in point was made, the device may be entered into a state of being operative as a check-in point (201). It should be noted that "device" here refers to a device having one or more apps, services, components or component layers, or other aspects operative to receive the designation of the device as a check-in point and, in many cases, enacting process flows such as illustrated in FIGS. 2A-2B. An example of a device architecture is discussed in more detail with respect to FIG. 3.

Now designated as a check-in point, the first group member device may select a location-sensing capability (202). A location-sensing capability (or "modality") may be determined by one or more factors, including: the availability of the location-sensing capability; and the specificity and accuracy with which the capability may detect other devices considering environmental factors (e.g., indoors or outdoors) and usage needs. In some cases, a hierarchy may be used to determine the modality for location sensing (i.e., the particular location-sensing option). For example, GPS, Wi-Fi, and Bluetooth, and acoustical may be used in a particular order based on availability and/or permissions.

In some cases, a particular modality of a location-sensing capability may, by design or due to certain conditions, not be available to a device. For example, GPS geolocation is sometimes spotty due to poor reception of a sufficient number of satellites to triangulate the device location. Similarly, mobile device network capability (cellular or Wi-Fi) is sometimes unavailable indoors or in remote areas. Without the network capability, GPS coordinates may not be communicated to other group members (over the network or through a social network service). However, device-to-device communication methods may be available between the devices and, in some cases, may be the preferred modality. Device-to-device methods do not necessarily rely on a third party service, so they may sometimes be available when other capabilities are not. For example, a Bluetooth modality such as a Bluetooth Low Energy (BLE) scanning method conducted between devices may be available if two members' devices come within range of one another. BLE may enable low-power scanning using the Apple iBeacon® specification. iBeacon® uses Bluetooth low energy proximity sensing to transmit a unique identifier associated with a device over a signal that may be picked up by a receiving device when the transmitting and the receiving device are in range of one another.

Operative services on the first group member device (operating as a check-in point) may choose an appropriate location-sensing capability in response to granularity requirements. For example, GPS capability may not be granular (i.e., precise) enough as a location-sensing technique inside a structure or building. A check-in point may need more accurate detection of proximity in a crowded mall, for example, where even a nearby group member may be less visible through the crowd. Hence, in some cases a device-to-device capability, such as BLE, may be preferable because the location of a device is desired with greater precision, even when an alternative method is available.

Furthermore, the selection capability may dynamically, periodically, or continuously adjust in reference to availability and granularity requirements with respect to the current location of a dynamic check-in point within an environment.

Another factor in the determination of an appropriate location-sensing capability may be in response to the privacy settings of one or more group members. For example, a group member (which can include both the check-in point member and one or more other members of the group) may not enable certain location-sensing features for privacy reasons. The group member may not want her GPS location, for example, to be continuously broadcast to a social networking platform and stored by the platform. Hence, the member may disable tracking features generally on the device or specifically on the social networking platform. Alternatively, a group member may indicate such privacy settings as a property of the group itself. Thus, an operative component may select a device-to-device method in response to such privacy settings.

After having chosen an appropriate location-sensing capability to be used between the first group member device as the check-in point and each other member device (individually or as a group), any devices having an identifier corresponding to another group member within a detection zone of the check-in point may be detected (203). Another group member device's presence within the detection zone may be determined with varying precision depending on the location-sensing modality utilized. For example, a group member device may continuously broadcast its GPS location to a social networking platform's cloud server over a mobile device network, which communicates this location information to the first group member device. Since the GPS location of a group member's device is continuously known, a location-sensing component at the check-in point device utilizing the GPS location-sensing capability may compare the known location of the group member's device to the check-in point's own GPS-specified location to determine a relative proximity.

In some cases, a device-to-device location-sensing method such as BLE may be used. For example, a unique identifier for a member's device may be recorded when a member signs up for the social networking platform service. By virtue of membership in the group, the group member's unique identifier may become detectable to the check-in point device. The unique identifier may allow the check-in point device to identify this second group member device from among other transmitting devices so that, when the check-in point device detects the identifier, the device belonging to the other group member is known to be within Bluetooth range.

Optionally, detection of another group member device may allow one or more events to be triggered in the check-in point device, at which time control flow may continue with FIG. 2B (204). FIG. 2B shows an example flow in which other group members may be notified of the arrival or presence of a group member within the detection zone.

In the scenario shown in FIG. 2B, beginning at step 250, the check-in point device may notify other group members about the arrival or presence of another group member device at the check-in point. The other group members to be notified may include the check-in point member, other members of the group who are already present at the check-in point, and/or other group members who may not have arrived, depending on functionality and settings defined for the group.

In some situations, a member may not want her arrival at a check-in point to be known to other members of a group, even when such functionality is available. In some cases, a check-in point device may communicate with the detected group member's device to request an assent to tracking (251). The tracking request can allow the detected group member to affirm or deny the notification by the check-in point to other group members. If the detected group member assents to the tracking, an indication of assent may be received by the check-in point (252).

In some cases, assent to track may be required depending on group functionality and settings; in some cases, the nature of the group may dictate that assent need not be requested. For example, in some scenarios, a "group auto check-in" capability may be available so that, when enabled for a group, group members' devices would perform continuous BLE scanning. When a member device comes within the detection zone of the check-in point device, other group members may be notified automatically. A group having the students in a class as members may advantageously use a group auto check-in capability.

Whether the check-in point either receives an indication of assent, or whether an indication of assent was unnecessary, other group members may be notified of the arrival or presence of the detected group member within the detection zone of the check-in point (253).

The mechanism used for notification (and/or tracking requests) may vary according to the location-sensing capability selected and utilized. When available, the notification or tracking request may be sent over the mobile device network to the social networking service and then disseminated to the pertinent group members. However, when device-to-device location-sensing capabilities are selected, other communication forms may be used to disseminate the notification or tracking request. For example, Bluetooth and BLE enable a communication path between the devices to be established such that the notification may be distributed using a local, device-to-device communication channel.

If the member assents to tracking, distance and ranging information may also be communicated between group member devices. In the case of BLE, for example, distance and range between devices and the check-in point may be determined from the signal strength of the BLE signal. In some cases, the distance and ranging information may be operative to support a mobile device display showing group member locations.

In some cases, loss of a BLE signal from a particular group member device may initiate a notification to one or more group members' devices to indicate that the tracked member may be lost or out of reasonable range of the dynamic check-in point.

In a general embodiment of the subject invention, when a group member goes out of the detection zone of the check-in point (e.g., a child or elder has wandered or otherwise left the proximity of the group), a group leader may report a "lost & found request" to a cloud service that manages or facilitates certain member interactions. The description of this general embodiment also describes implementation aspects that may be relevant to other embodiments.

In some cases, a lost group member may be wearing, for example, a wearable tag that provides tracking and locating services via a device-to-device location sensing capability such as BLE. Because the wearable tag is a sometimes a small, low-cost, and low-power consumption technology, the tag may not have GPS localization capability or other network features. Additional techniques may be used to determine the absolute location of a lost member once the member/tag is outside the detection zone.

To determine the location of the lost group member, a cloud service, which may be part of an existing social network, may leverage nearby participators' smartphones (or other computing devices) to perform crowd sensing in a transparent way (e.g., in the background). A participator may or may not be the group member, but enables the crowd sensing capability in her/his smartphone.

A participator can enable the crowd sensing capability on their device by virtue of their participation in a social network, for example by "opting into" (or not opting out of) a setting/option or group to help find lost group members. In some cases, a participator may join a cloud service specifically targeted at assisting users of the cloud service to find lost people. The participator in the service to assist in finding lost people may, or may not, be one of the members of the group with the missing member.

In an example detection group scenario, the detection group is formed of at least one mobile device belonging to the group leader who forms the check-in point, and at least wearable tags on the other group members; other group members can also use more robust mobile devices. The members of the group are virtually connected via a peer-to-peer communication channel such as BLE, which the group leader might initialize by adding all of the nearby devices via pairing. The group leader's mobile device may have local components that provide device-to-device communication channels, as well as permit connection to a social networking infrastructure or other cloud service that can provide check-in point functionality.

In a normal mode of operation of a detection group, devices belonging to members of the group initialize their presence by advertising a unique identifier (e.g., a UUID), and then being manually checked in by a group leader or automatically checked in by the social networking infrastructure. After group members have joined the detection group, devices belonging to the members transmit their UUIDs, along with other metadata, as the "heartbeat" signal to the leader via BLE connection mode. The group leader's mobile device replies with a response when it receives this "heartbeat" signal. The received signal strength (RSS) is monitored as the closeness indication. If the RSS value for each group member is higher than the predefined detection threshold, then no members are lost; the RSS monitoring will continue and the system state is kept in normal mode.

A prevention mode of the detection group can be entered when an RSS value of a group member device is lower than the detection threshold. A prevention mode can serve as an intermediate state or mode of alarm to inform a detection group that one of its members may be out of the detection zone, but before entering into an emergency (e.g., "SOS") mode that involves participators' devices in the vicinity. A prevention mode may be entered, for example, when the RSS value is low (or lost completely) because a networking environment is highly unstable or reception is interfered with.

When the detection group enters prevention mode, further information may be needed to determine the current status of the member device having a low RSS value. Components on the group leader's device (or the cloud or social networking service to which the components may connect) in some cases perform outlier detection with historical RSS values (for example, for the same or similar physical environments or member device types, etc.) to determine the likelihood the low RSS value is a false alarm.

When the RSS value continues to decrease or is lost entirely, components on group leader's device, in some implementations, can push an alert notification that surfaces on the leader's device. This alert notification could remind the leader to check around for nearby members before a full scale emergency mode is entered for the detection group.

An emergency mode, or SOS mode, may be entered to enlist the aid of participators' devices. A device belonging to the wayward group member determines the conditions for entering SOS mode and searching for help. The SOS mode could trigger nearby participators' devices for assistance; this triggering process involves a high cost and could waste the battery power of nearby participators. Therefore, if the out-of-contact device is not highly confident that it is lost, the SOS mode is evaluated using further information.

A group member device that does not receive a response to its heartbeat signal may reattempt connection to the group leader device for a certain number of attempts and/or for a certain time period. Depending on the type of member device, the device may increase the signal strength of the device-to-device connectivity in one or more increments in an effort to reestablish connection to the group leader device. For example, a wearable tag may rescan nearby BLE beacons and try to re-connect to the leader's device. If the lost BLE connection to the group leader cannot be re-established, and none of the other group members' BLE heartbeat is scanned and captured within a pre-defined time period, the "lost" device will enter into an SOS mode to broadcast its existence and lost status with an SOS signal having a special "SOS" UUID. The SOS UUID may be unique for each member device, for each detection group, or for the each social networking or cloud service, for example.

Embodiments of the subject invention using a prevention mode may in some cases include capabilities to minimize false alarms. In some implementations of a prevention mode, for example, the group leader's device pushes an alert notification if one of the group members' device-to-device communication beacon (e.g., BLE) is lost or the RSS is too weak. However, since in some environments a device-to-device communication channel can be unstable, such an alert should not occur too frequently without basis.

To minimize the number of false alarms while keeping an adequate detection rate, low-complexity detection approaches can be applied. For example, for a current RSS value ($\hat{r}_i$) and a confidence interval $\alpha_i$, if the measured RSS value ($r_i$) is outside the range of $[\hat{r}_i-\alpha_i, \hat{r}_i+\alpha_i]$, then the current measured RSS is an outlier. Therefore, further measurement can be used to determine the closeness of a group member before pushing an alert.

In some circumstances, no network (e.g., Internet) connectivity may available. This may occur because of the lack of connectivity options (e.g., no router), or because the device is a wearable tag or similar very simple device with limited connectivity capabilities. However, sometimes additional communication may be needed, for example, if the group leader did not report the member as lost; in such cases, the transmission frequency of the SOS beacon can be lowered to minimize the energy cost both to the member device and nearby participators. As a further example, if the group leader canceled the searching/finding process, the lost device can be made aware of the cancellation (and other events) even without connectivity to the group leader, other group members, and the Internet.

In some embodiments, certain techniques can establish a communication channel through nearby participators' devices when connectivity is needed as, for example, when a lost device needs to communicate its SOS signal or receive a signal cancelling the SOS. If one participator's device receives the SOS beacon, components on the participator's device will report the SOS beacon to the social networking service or cloud service. When the out-of-zone device is in the SOS mode, the device can also accept connections from nearby participators. A crowd-sensing approach may be used allowing nearby participators to relay the message from the server to the out-of-zone device.

In some cases, at the social networking or cloud service, the identifier of this SOS beacon (e.g., the SOS UUID) is checked against the service's list of members or member devices reported as lost (e.g., in a table of a data store) by group leader/owner devices. If the SOS UUID is found on the list, the participator is sent an instruction from the service to begin the "localization process" to locate the lost tag.

Alternatively, if the group leader has not reported the out-of-zone device's member lost, the participator is sent a signal including information that the out-of-zone device is unreported, which the participator device relays to the out-of-zone device. The out-of-zone device may respond in various ways, e.g., by decreasing the frequency of issuance of its SOS beacon. Furthermore, in some cases, the participator may be instructed by the cloud service that the SOS was canceled by the group leader (occurring, e.g., when the lost member can be seen by the group leader visibly but the member's device is not in range). The participator may send a "cancel" state to the out-of-zone device, to which the device may respond by delaying the frequency of the SOS beacon or canceling it altogether.

When an out-of-zone device enters SOS mode, nearby participators' devices may receive the SOS beacon and initialize the localization process. This may occur, in some cases, after one or more participator device have confirmed that the SOS mode is reported at the cloud service. An out-of-zone device attempts to reach as many participators as possible, preferably those participators with GPS location capability so that the lost device can be estimated and reported to the cloud service and/or group leader.

Depending on implementation, participators may be able to choose the level at which they wish to participate in services providing localization to lost group members. For example, participators may choose whether to provide any combination of device-to-device communication, Internet connectivity, and GPS location support. GPS location support, for example, uses more battery energy and thus participators may choose not to provide it.

Since participators may choose their level of support to the service, any combination of these capabilities may be available, essentially at random, in the proximity of a lost device. Thus, embodiments make opportunistic use of crowd-sensed data provided from these various resources. Participators who opt to provide location information from their GPS capability may be called "anchor" participants herein.

Techniques may be used in some implementations for determining the absolute location of a lost device from a given mixed-capability set of participators. Certain implementations model the group leader's mobile device as a navigator in the navigation coordinate (n-frame). The n-frame is used to characterize the absolute movement of the group leader's device with respect to the indoor/outdoor environment, which is a local geographic frame. The location measurement from the GPS module of a smartphone is at Geodetic coordinates (latitude $\varphi$, longitude $\lambda$, height h), e.g., in WGS 84 datum. To convert the Geodetic coordinates to the navigation coordinate, it is converted to the earth-centered earth-fixed (ECEF) coordinate, then the ECEF is converted to an ENU frame via the formula described in K. Liu, Q. Huang, J. Wang, X. Li, and D. O. Wu, "Improving gps service via social collaboration," in Mobile Ad-Hoc and Sensor Systems (MASS), 2013 IEEE 10th International Conference on. IEEE, 2013, pp. 393-401, which is incorporated herein by reference. By subtracting the reference point $O_R$, the GPS location is mapped to the navigation coordinate (n-frame) for analysis.

Assume the position of the wearable tag in the n-frame is $y^n \in \mathbb{R}^d$, i.e., a 2-D coordinate (d=2) of $y^n$. For notation simplicity, $y=[x, y]^T$ is referred to as $y^n$ in the navigation coordinate without the superscript. When a member device is lost, it will broadcast the beacon in "SOS" mode, the communication range being denoted as $R_B$. Assume the nearby m-th participator within the range $R_B$ is $a_m$, where m is the index number in a set of M participators. The location of the m-th participator is denoted as $x^m \in \mathbb{R}^d$. For most of the cases, the dimension could be simplified to d=2, thus each element of $x_m$ is a 2-D coordinate as $[x_m, y_m]^T$, m=1, . . . , M. The location of other participators $x_m$ is unknown for most cases.

Since the GPS module is power-hungry and computationally heavier than, e.g., BLE communication, only some participators are likely to allow access to the GPS location. If the participator allows access to the GPS location, then $x_m$ could be estimated by the GPS result as $\hat{x}_m$, with the total number as $M_a$. Thus, the location of the m-th participator is denoted as $\hat{x}_m$ only if available, and the set of GPS-enabled participators are defined as a subset of $\mathbb{R}^d$ as $\mathbb{R}_a^d$.

The objective of finding the lost member via crowd-sensing is to estimate y if the lost member's device goes out of range of the group leader's mobile device. Thus, a high accuracy of y is desirable, as it relates to a smaller searching region. Measurements available are the RSS distance measurement from the lost device, and the GPS location in the subset of participators with GPS enabled ($\mathbb{R}_a^d$).

If the wearable tag could reach one participator with location information ($x_m$), the value of y could be roughly estimated via the $x_m$ and the ranging value $\hat{r}_m$, where $r_m$ denotes the ground truth distance and $\hat{r}$ denotes the estimated value. The accuracy of y depends on the distance and the accuracy of ranging and location. For example, if the GPS location accuracy of $x_m$ is 8 meters, the resulting search area is around 201 m². For the lost member, if $r_m$=20 meters and the ranging accuracy of $\hat{r}_m$ is around 5 meters, the resulting search area is around 3421 m², a huge area to search.

In some embodiments, to narrow down the search area and make it acceptably small, a significantly higher accuracy of y can be obtained using multiple participators in the location estimation. The detailed accuracy requirement depends on the specific environment, but in general an accuracy of y measured in meters or tens of meters can be sufficient for performing a manual search for the lost member.

In some cases, trilateration can be used. For example, a distance measurement from multiple participators can be written as:

$$\hat{r}_m = \|y - x_m\|_2 + \delta_m + n_m \quad (1)$$

where $\delta_m$ is the drift or bias for the wearable device—GPS capable device pair, and $n_m$ is the measurement noise. Each element of $r_m$ is $r_m = \|y - x_m\|_2$, that is, from the wearable device tag to the m-th participator, where $\|\cdot\|_2$ calculates the 2-norm and obtains the Euclidean distance. Since $r_m$ should be non-negative, use $\hat{r}_m = |\hat{r}_m|$ to prevent negative values due to noise. Define the unknown parameter vector as $\theta = [y]^T$. The localization process can then be performed by estimating $\theta$ by using approaches such as Bayesian or Maximum-Likelihood (ML) estimation techniques.

With 2-D coordinates, the number of participators with GPS location enabled should be $M_a \geq 3$ for localization processes, or trilateration. Since device-to-device communication mechanisms such as BLE only cover limited areas, there may not be enough participators having GPS location enabled in direct range of the lost device.

Therefore, some embodiments may utilize techniques for reaching more participators' devices by connecting participators' devices to the lost member device indirectly ("indirect participator devices") via one-hop or multiple hops. Specifically, if the immediate surroundings of the wearable device tag do not have enough participators with location information, participators that are within one-hop of a participant reachable by the lost device may provide a higher probability of finding an anchor device. In some cases, more than one-hop could be used for even better localization.

In one example implementation of a one-hop technique, the accessible participators via a one-hop m'-th participator can be denoted as $a_{m',n}$ where $n=1, \ldots, N_a$. The available location measurements in these $N_a$ participators is included in vector $x_{m',n}$. Among all these second-hop participators, the set of participators with location capability can be written as $\mathbb{R}_{a,m'}^d$. Thus, the measurement model can be rewritten as $$\hat{r}_m = \|y - x_m\|_2 = \delta_m + n_m, m \in \mathbb{R}_a^d$$

$$\hat{r}_{m'} = \|y - x_{m'}\|_2 = \delta_m + n_m, m \in \mathbb{R}_a^d, m' \in \mathbb{R}^d$$

$$\hat{r}_{m',n} = \|X_m - x_{m',n}\|_2 = \delta_{m',n} + n_{m',n}, n \in \mathbb{R}_{a,m'}^d \quad (2)$$

where the second part of Equation (2) means the ranging between the lost member device and the m'-th participator that does not contain location capability. The third part of Equation (2) means the ranging measurements between the m'-th participator and its own nearby accessed participators with location capability enabled. Through this one-hop technique, more location-enabled participators are available and the probability of locating the lost device is increased.

To improve the localizability and accuracy of the lost group member y, more sensing results in Equation (2) may be obtained by leveraging multi-hop assistance to reach more participators. However, using all these new measurements in the localization process is more complex than a trilateration process. The involved multi-hop assistance and sparse ranging measurements can make the location estimation problem highly nonlinear, non-convex and hard to solve.

Solving the localization problem via multi-hop measurements in Equation (2) is different from the conventional trilateration approaches that use methods based on Least Squares (LS). As noted, LS-based trilateration utilized the known location of anchor nodes and anchor-to-mobile node ranging measurements to obtain approximate ML solutions by linearizing the initial non-linear problem. However, sometimes crowd-sensing-based localization does not have enough one-hop anchor nodes, and/or the available anchor locations are not accurate enough.

When the problem becomes complex, LS-based approaches may converge to the local optimal solutions, e.g., when the measurement noise is not Gaussian. The local optimal in some cases can be avoided by converting the initial non-convex problem to convex problems. Among existing solutions, Semi-Definite Programming (SDP) has been demonstrated to have a tight bound with the initial non-convex problem and tends to achieve global optimal results. However, in crowd-sensing-based localization in a lost group member scenario, the available ranging measurements can be significantly more sparse than other kinds self-localization problems. Further, the available distance constraint is not sufficient when applying the conventional SDP for localization.

Although conventional SDP is not suitable for a crowd-sensing scenario, it provides a technical tool for solving this non-convex localization problem that may be adapted for some embodiments of the subject invention. In contrast to the LS-based method that linearizes the initial nonlinear problem and requires a good initial value to ensure convergence, an SDP approach is insensitive to large errors and can help avoid the problem of converging to the local optimal. However, two challenges can remain in some cases: 1) Insufficient ranging information may cause the SDP problem to be unsolvable; and 2) there is amplified location bias error when mapping back to the physical space because two accurate anchor locations are needed as a baseline.

In some embodiments, to solve the problem of insufficient ranging information when applying the SDP to the crowd-sensing setting, the SDP problem can be reformulated by jointly leveraging the available sparse ranging and coarse-grained location information. Thus, instead of relying on two anchor locations as a baseline, embodiments may derive the mapping during the location estimation by optimizing the global bias between all the available participator locations.

Represented mathematically, the unknown location of the assistant $x_{m'}$ in a multi-hop relay is jointly estimated with the target y. The residue vector in Equation (2) is denoted as $\varepsilon_m = [\delta_m + n_m, \ldots]$, $\varepsilon_{m'} = [\delta_{m'} + n_{m'}, \ldots]$, and $\varepsilon_{m',n} = [\delta_{m',n} + n_{m',n}, \ldots]$, respectively. Therefore, $\varepsilon$ is defined as a summation $\varepsilon = [\varepsilon_m, \varepsilon_{m'}, \varepsilon_{m',n}]$. The vector of the unknown parameter is $\theta = [y, x_{m'}]$.

The location objective function of $\theta$ for jointly estimating the vector of unknown parameter $\theta = [y, x_{m'}]$ could be written as $$\hat{\theta}_{ML} = \arg\min_\theta \left( \sum_{\forall m, m', (n', n)} \varepsilon^2 \right) \quad (4)$$

-continued $$= \arg\min_\theta \left( \sum_{\forall m \in \mathbb{R}_a^d} \varepsilon_m^2 + \sum_{\forall m' \in \mathbb{R}^d \cap \mathbb{R}_a^d} \varepsilon_{m'}^2 + \sum_{\forall n \in \mathbb{R}_{a,m'}^d} \varepsilon_{m',n}^2 \right)$$

where the three different constraints leverage all the sparse ranging and coarse-grained location information. The solution of Equation (4) is optimal in the ML sense and highly nonlinear with constraints in Equation (2). Instead of using the square errors in Equation (4) that result in a non-linear problem, the error formulation is modified as a matrix linear operation before SDP relaxation. Using the first equation in Equation (2) as an example, the location objective function can be rewritten as $$y = \arg\min_y \; \max_{m,m'} \frac{\{|\|y - x_m\|_2^2 - \hat{r}_m^2| + |\|y - x_{m'}\|_2^2 - \hat{r}_{m'}^2|\}}{\xi_2} + \quad (5)$$

$$\arg\min_y \; \max_{m',n} \frac{|\|x_{m'} - x_{m',n}\|_2^2 - \hat{r}_{m',n}^2|}{\xi_2}$$

Equation (5) calculates y by minimizing the maximum residual error, where the E in Equation (4) becomes a max operation. Thus a minimax approximation may be used to linearize the initial problem into linear matrix operations for the semidefinite relaxation. The objective function in Equation (5) can be converted to minimize e at the constraint of an inequality expression: $-\in \leq \xi_1 + \xi_2 \leq \in$, while $\xi_1$ and $\xi_2$ are the residual error in Equation (5) for the first and second term.

The initial problem of Equation (5) can be formulated to semidefinite programming form. The unknown parameter vector can be summarized as $\theta=[y, x_{m'}, Y_{m'}, Y_{n,n}, Y_{m',n}]$ and Equation (5) can be equivalently reformulated as $$\min_\theta \in \quad (6)$$

$$s.t. \; -\in < tr\left\{ \begin{bmatrix} y & y \\ y^T & 1 \end{bmatrix} \begin{bmatrix} I_d & -x_m \\ -x_m^T & x_m^T x_m \end{bmatrix} \right\} - \hat{r}_m^2 < \in,$$

$$-\in < tr\left\{ \begin{bmatrix} Y & y \\ y^T & 1 \end{bmatrix} \begin{bmatrix} I_d & -x_{m'} \\ -x_{m'}^T & x_{m'}^T x_{m'} \end{bmatrix} \right\} - \hat{r}_{m'}^2 < \in,$$

$$-\in < Y_{m'} - Y_{m',n} - Y_{n,m'} + Y_{n,n} - \hat{r}_{m',n}^2 < \in \begin{bmatrix} Y & y \\ y^T & 1 \end{bmatrix} \succeq 0,$$

$$\begin{bmatrix} I_d & x_{m'} & x_{m',n} \\ x_{m'}^T & Y_{m'} & Y_{m',n} \\ x_{m',n}^T & Y_{n,m'} & Y_{n,n} \end{bmatrix} \succeq 0$$

where $m \in \mathbb{R}_a^d$, $m' \in \mathbb{R}^d \cap \mathbb{R}_a^d$ and $n \in \mathbb{R}_{a,m'}^d$ The location of the wearable tag of the lost group member (y) can be extracted from the solution of $\theta=[y, x_{m'}, Y_{m'}, Y_{n,n}, Y_{m',n}]$ where y is optimal in terms of all the available measurements.

In some embodiments employing the SDP optimization of Equation (6), the location of $a_{m'}$ (anchor) is used as an unknown parameter in the solution of $\theta$ as $x_{m'}$. To utilize the feature that $x_{m'}$ is accurate and reliable when $N_a \geq 3$, the estimated result of $\hat{x}_{m'}$ from Equation (10) can be used as a "virtual anchor" that optimizes the location result of $\hat{y}$ and obtains an optimized value of $\hat{y}_{op}$.

After the process of obtaining $\hat{x}_{m'}$ from Equation (6), it may be used to construct a new vector of nearby anchor points as $z_{m_a}=[x_m \; \hat{x}_{m'}]$ where $m_a=1, \ldots, M_a+1$. The ranging measurement could be reconstructed as $r_{m_a}=[\hat{r}_m \| \hat{y} - \hat{x}_m \|_2]$. Another optimization step via the newly constructed anchor vector $z_{m_a}$ could be performed by relying on the minimization of residual error e with the unknown parameter as $\theta=[y_{op} \; Y_{op}]$ where $Y_{op}=y_{op}^T y_{op}$. The constraint of this refinement could be written as $$-\in < tr\left\{ \begin{bmatrix} Y_{op} & y_{op} \\ y_{op}^T & 1 \end{bmatrix} \begin{bmatrix} I_d & -z_{m_a} \\ -z_{m_a}^T & z_{m_a}^T z_{m_a} \end{bmatrix} \right\} - \hat{r}_{m_a}^2 < \in \quad (7)$$

For some cases, the refined result of $y_{op}$ may suffer performance degradation over the initial result of $\hat{y}$ due to a large error related to the location of the virtual anchor. Thus, a threshold-based detection process can be applied to mitigate a virtual anchor with low-confidence.

FIG. 2C shows an example process flow for implementing an SDP optimization of Equation (6) and a virtual anchor for assistance. In FIG. 2C, $\sigma_{th}$ and $\gamma$ are the threshold for minimizing the side-effects of error in the virtual anchor.

Figure 3:
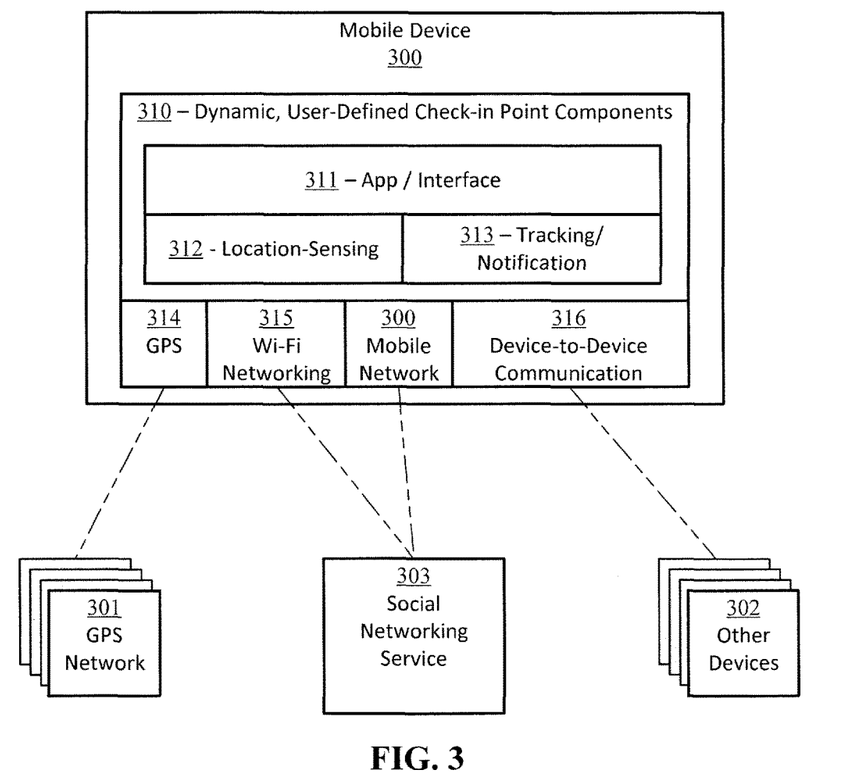
FIG. 3 shows an example social networking platform system environment relevant to some implementations.

FIG. 3 shows an example social networking platform system environment relevant to some implementations. In FIG. 3, mobile device 300 may interact with various off-device location-sensing technologies, such as GPS 301, with other devices 302, and in some cases with a social networking service 303. Social networking service 303 may provide friend and group management services, for example, or other services appropriate to interacting with friends, family, or interest groups.

On mobile device 300, components implementing dynamic, user-defined check-in points may be instantiated 310. Check-in point components 310 may be implemented in one or more system or component layers, such as app/interface components 311, location-sensing components 312, and tracking/notification components 313.

App/interface components 311 may be operative to enable the user of a mobile device 300 interacting with a social networking service 303 to designate himself or herself (or another person or device) as a dynamic, user-defined check-in point. App/interface components 311 may also enable the surfacing of notification messages to indicate arriving group members, or visual, auditory, or tactile depictions on the mobile device 300 of the distance, direction, speed, or relative positioning of other devices 302 belonging to group members.

Location-sensing components 312 can interact with other system layers on the mobile device to select an appropriate location-sensing capability and then use that capability to detect the presence of group members when device 300 acts as a check-in point. Thus, location-sensing components 312 may be suitable for implementing certain steps in the flow diagram in FIGS. 2A-2C, for example. Location-sensing components 312 may interact with the GPS capability 314 of the mobile device 300, or with Wi-Fi networking capabilities 315 to enable Wi-Fi RSSI or fingerprinting. Location-sensing components 312 may also interact with device-to-device communications methods (e.g., BLE) 316 to analyze the signals and locations of other devices 302.

Location-sensing components 312 may also interact with other components, such as tracking/notification components 313, to coordinate other functions. Tracking/notification components 313 may be operative to, for example, communicate GPS or other location information via a Wi-Fi network or mobile network to a social networking service 303. Tracking/notification components 313 may also send communications to a detected group member device to ask permission for the device to be tracked so that other group members may be notified of the detected member's arrival at the check-in point.

It should be noted that the separation of the location-sensing 312, tracking/notification 313, and app/interface 311 components is a logical distinction rather than a physical distinction. A single component having some or all of the features described is also possible. It is also possible for some devices to have some, but not all, components depending on the implementation scenario.

Figure 4:
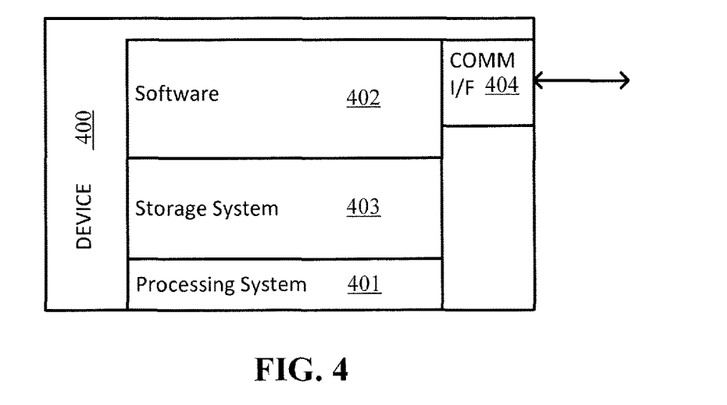
FIG. 4 shows a block diagram illustrating components of a computing device or system used in some implementations.

FIG. 4 shows a block diagram illustrating components of a computing device or system used in some implementations. For example, any mobile device 300, other devices 302, or social networking service 303 (from FIG. 3), or intermediate servers facilitating interaction between mobile device and storage server may be implemented as device 400, which can include one or more computing devices.

Mobile device 300, as depicted in FIG. 3 and further described in here in FIG. 4, may have some or all of the system components described. In some cases, however, the mobile device may be a device with fewer or different capabilities than a typical mobile device such as a smartphone or tablet. Similarly, the devices 302 may be devices with fewer or different capabilities than shown. For example, in the lost member (e.g., parent-child) tracking scenario described, the lost member's mobile device may be BLE-capable, but may lack user interface, app, GPS, or other features. Such a device may include a smart locator card, bracelet, necklace, article of clothing or other substrate that can be worn or attached to a person or animal and that can transmit an identifier (e.g., via BLE). Devices 300, 302 may form a hybrid social network. In some cases, the BLE-capable, but more limited device (such as a smart locator card or wearable tag or card) can define a check-in point and/or join/leave check-in points of any member of the group.

The device 400, particularly when implementing device 300, can include smart phones, laptop computers, smart televisions, entertainment devices, desktop computers, hybrid computers, gaming machines, wearable computers (e.g., watch, eyeglasses) and/or other types of computing devices.

The device 400, particularly when implementing social networking service 303, can include one or more blade server devices, standalone server devices, personal computers, routers, hubs, switches, bridges, firewall devices, intrusion detection devices, mainframe computers, network-attached storage devices, and other types of computing devices. The server hardware can be configured according to any suitable computer architectures such as a Symmetric Multi-Processing (SMP) architecture or a Non-Uniform Memory Access (NUMA) architecture.

The device 400 can include a processing system 401, which may include a processing device such as a central processing unit (CPU) or microprocessor and other circuitry that retrieves and executes software 402 from storage system 403. Processing system 401 may be implemented within a single processing device but may also be distributed across multiple processing devices or sub-systems that cooperate in executing program instructions.

Examples of processing system 401 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 403 may comprise any computer readable storage media readable by processing system 401 and capable of storing software 402. Storage system 403 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations storage system 403 may also include communication media over which software 402 may be communicated internally or externally.

Storage system 403 may be implemented as a single storage device but may also be implemented across multiple storage devices or sub-systems co-located or distributed relative to each other. Storage system 403 may include additional elements, such as a controller, capable of communicating with processing system 401.

Software 402 may be implemented in program instructions and among other functions may, when executed by device 400 in general or processing system 401 in particular, direct device 400 or processing system 401 to operate as described herein for enabling dynamic, user-defined check-in points. Software 402 may provide program instructions that implement components for dynamic, user-defined check-in points, including app/interface components 311, location-sensing components 312, and tracking/notification components 313. Software 402 may implement on device 400 components, programs, agents, or layers that implement in machine-readable processing instructions the methods described herein as performed by components for dynamic, user-defined check-in points.

Software 402 may also include additional processes, programs, or components, such as operating system software or other application software. Software 402 may also include firmware or some other form of machine-readable processing instructions executable by processing system 401.

In general, software 402 may, when loaded into processing system 401 and executed, transform device 400 overall from a general-purpose computing system into a special-purpose computing system customized to facilitate dynamic, user-defined check-in points. Indeed, encoding software 402 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage.

A communication interface 404 may be included, providing communication connections and devices that allow for communication between device 400 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 400 may be included in a system-on-a-chip (SoC) device. These elements may include, but are not limited to, the processing system 401, a communications interface 404, and even elements of the storage system 403 and software 402.

In some cases, such as for social networking service 303, device 400 may represent any computing system on which software 402 may be staged and from where software 402 may be distributed, transported, downloaded, or otherwise provided to yet another computing system for deployment and execution, or yet additional distribution.

In embodiments where the device 400 includes multiple computing devices such as for implemented social networking service 303, one or more communications networks can be included that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain aspects of the subject invention provide the following non-limiting embodiments:

Example 1

A method of enabling user-defined check-in points, the method comprising: receiving a designation of a first group member device as a check-in point for a group having a plurality of members; and detecting, using a selected location-sensing capability at the first group member device, any group member devices having an identifier corresponding to another group member within a detection zone of the check-in point.

Example 2

The method of example 1, further comprising notifying one or more group member devices that a detected group member device is within the detection zone of the check-in point.

Example 3

The method of example 2, wherein, prior to notifying: sending a tracking request to the detected device; and receiving from the detected device an indication of assent to tracking.

Example 4

The method of any of examples 1-3, wherein the selected location-sensing capability is determined by one or more of availability and granularity.

Example 5

The method of example 4, wherein the selected location-sensing capability is determined by using a hierarchy of two or more location-sensing options to determine an available location-sensing option.

Example 6

The method of any of examples 1-5, wherein the location-sensing capability is selected based on a user or group privacy setting.

Example 7

The method of any of examples 1-6, wherein the location-sensing capability is based on a device-to-device communication modality.

Example 8

The method of example 7, wherein the device-to-device communication modality is Bluetooth Low-Energy scanning.

Example 9

One or more storage media having instructions stored thereon that when executed by a processing system direct the processing system to: turn on a check-in point broadcast at a first group member device; and identify group members as being present within a detection zone of the first group member device by receiving indications from any devices that are within the detection zone of the first group member device and that have an identifier corresponding to a member of a group having a plurality of members including a first group member associated with the first group member device.

Example 10

The one or more storage media of example 9, further having instructions stored thereon that when executed by the processing system, direct the processing system to identify any group members that are not present within the detection zone.

Example 11

The one or more storage media of any of examples 9-10, further having instructions stored thereon that when executed by the processing system, direct the processing system, prior to identifying a group member as being present within the detection zone, to send a tracking request to a detected device and receive from the detected device an indication of assent to tracking.

Example 12

The one or more storage media of any of examples 9-11, wherein the receiving indications from any devices is performed using a location-sensing capability determined by one or more of availability and granularity.

Example 13

An apparatus comprising: one or more computer readable storage media; program instructions stored on at least one of the one or more computer readable storage media that, when executed by a processing system, direct the processing system to: in response to receiving a designation as a check-in point for a group having a plurality of members, detect, using a selected location-sensing capability, any group member devices having an identifier corresponding to another group member within a detection zone of the check-in point.

Example 14

The apparatus of example 13, wherein the program instructions, when executed by the processing system, further direct the processing system to notify one or more group member devices that a detected device is within the detection zone of the check-in point.

Example 15

The apparatus of example 14, wherein the program instructions, when executed by the processing system, further direct the processing system, prior to notifying, to: send a tracking request to the detected device; and receive from the detected device an indication of assent to tracking.

Example 16

The apparatus of any of examples 13-15, wherein the selected location-sensing capability is determined by one or more of availability and granularity.

Example 17

The apparatus of example 16, wherein the selected location-sensing capability is determined by using a hierarchy of two or more location-sensing options to determine an available location-sensing option.

Example 18

The apparatus of any of examples 13-17, wherein the location-sensing capability is selected based on a user or group privacy setting.

Example 19

The apparatus of any of examples 13-18, wherein the location-sensing capability is based on a device-to-device communication modality.

Example 20

The apparatus of example 19, wherein the device-to-device communication modality is Bluetooth Low-Energy scanning.

Example 21

A method of locating a lost group member from a lost group member device, the method comprising: designating a group leader device as a check-in point for a group having a plurality of members; determining, when a received signal strength between the group leader device and a group member device is below a threshold value, that the group member device is an out-of-zone group member device; and locating the out-of-zone group member device, using a set of participators' devices, wherein the set comprises one or more direct participator devices within a direct device-to-device communication range of the out-of-zone group member device.

Example 22

The method of example 21, wherein the set comprises at least three direct participator devices, each direct participator device having an absolute location-sensing capability.

Example 23

The method of example 22, wherein locating the out-of-zone group member device uses trilateration of absolute locations of the at least three direct participator devices.

Example 24

The method of example 21, wherein fewer than three of the one or more direct participator devices in the set have an absolute location-sensing capability, wherein the set further comprises one or more one-hop indirect participator devices, wherein each one-hop indirect participator device connects to the out-of-zone group member device via at least one direct participator device.

Example 25

The method of example 24, wherein the set further comprises one or more multi-hop indirect participator devices, wherein each multi-hop indirect participator device connects to another one-hop or multi-hop indirect participator device.

Example 26

The method of example 25, wherein locating the out-of-zone group member device uses absolute locations of one or more one-hop or multi-hop indirect participator device.

Example 27

The method of any of examples 21-26, wherein the out-of-zone group member device does not have an absolute location-sensing capability.

Example 28

One or more computer readable media having instructions stored thereon, that when executed by a processing system, direct the processing system to perform the method according to any of examples 1-8.

Example 28

One or more computer readable media having instructions stored thereon, that when executed by a processing system, direct the processing system to perform the method according to any of examples 21-27.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of enabling user-defined check-in points, the method comprising:
receiving, at a first group member device, a designation of the first group member device as a check-in point for a group having a plurality of members;
selecting, at the first group member device, a location-sensing capability;
detecting, at the first group member device by using the selected location-sensing capability, any group member devices having an identifier corresponding to another group member within a detection zone of the check-in point; and
tracking, at the first group member device, a detected member group device.

2. The method of claim 1, further comprising notifying one or more group member devices that the detected group member device is within the detection zone of the check-in point.

3. The method of claim 2, wherein, prior to notifying:
sending a tracking request to the detected device; and
receiving from the detected device an indication of assent to tracking.

4. The method of claim 1, wherein the selected location-sensing capability is determined by one or more of availability and granularity.

5. The method of claim 4, wherein the selected location-sensing capability is determined by using a hierarchy of two or more location-sensing options to determine an available location-sensing option.

6. The method of claim 1, wherein the location-sensing capability is selected based on a user or group privacy setting or is based on a device-to-device communication modality.

7. One or more storage media having instructions stored thereon that when executed by a processing system direct the processing system to:
turn on a check-in point broadcast at a first group member device;
select a location-sensing capability at the first group member device;
identify, at the first group member device, group members as being present within a detection zone of the first group member device by receiving indications from any devices that are within the detection zone of the first group member device and that have an identifier corresponding to a member of a group having a plurality of members including a first group member associated with the first group member device; and
track, at the first group member device, an identified group member.

8. The one or more storage media of claim 7, further having instructions stored thereon that when executed by the processing system, direct the processing system to identify any group members that are not present within the detection zone.

9. The one or more storage media of claim 7, further having instructions stored thereon that when executed by the processing system, direct the processing system, prior to identifying a group member as being present within the detection zone, to send a tracking request to a detected device and receive from the detected device an indication of assent to tracking.

10. The one or more storage media of claim 7, wherein the receiving indications from any devices is performed using a location-sensing capability determined by one or more of availability and granularity.

11. An apparatus comprising:
one or more computer readable storage media;
program instructions stored on at least one of the one or more computer readable storage media that, when executed by a processing system, direct the processing system to:
in response to receiving a designation as a check-in point for a group having a plurality of members, select a location-sensing capability at the check-in point, detect, at the check-in point by using the selected location-sensing capability, any group member devices having an identifier corresponding to another group member within a detection zone of the check-in point, and track, at the check-in point, a detected member group device.

12. The apparatus of claim 11, wherein the program instructions, when executed by the processing system, further direct the processing system to notify one or more group member devices that a detected device is within the detection zone of the check-in point.

13. The apparatus of claim 12, wherein the program instructions, when executed by the processing system, further direct the processing system, prior to notifying, to:
send a tracking request to the detected device; and
receive from the detected device an indication of assent to tracking.

14. The apparatus of claim 11, wherein the selected location-sensing capability is determined by one or more of availability and granularity.

15. The apparatus of claim 11, wherein the location-sensing capability is selected based on a user or group privacy setting or is based on a device-to-device communication modality.

16. A method of locating a lost group member from a lost group member device, the method comprising:
designating a group leader device as a check-in point for a group having a plurality of members;
determining, when a received signal strength between the group leader device and a group member device is below a threshold value, that the group member device is an out-of-zone group member device; and locating the out-of-zone group member device, using a set of participators' devices, wherein the set comprises one or more direct participator devices within a direct device-to-device communication range of the out-of-zone group member device.

17. The method of claim 16, wherein the set comprises at least three direct participator devices, each direct participator device having an absolute location-sensing capability.

18. The method of claim 17, wherein locating the out-of-zone group member device uses trilateration of absolute locations of the at least three direct participator devices.

19. The method of claim 16, wherein fewer than three of the one or more direct participator devices in the set have an absolute location-sensing capability, wherein the set further comprises one or more one-hop indirect participator devices, wherein each one-hop indirect participator device connects to the out-of-zone group member device via at least one direct participator device.

20. The method of claim 19, wherein the set further comprises one or more multi-hop indirect participator devices, wherein each multi-hop indirect participator device connects to another one-hop or multi-hop indirect participator device.

21. The method of claim 20, wherein locating the out-of-zone group member device uses absolute locations of one or more one-hop or multi-hop indirect participator device.

22. The method of claim 16, wherein the out-of-zone group member device does not have an absolute location-sensing capability.

\* \* \* \* \*